United States Patent [19]
Grau

[11] Patent Number: 5,775,732
[45] Date of Patent: Jul. 7, 1998

[54] DEFLECTION FITTING FOR SAFETY BELTS

[75] Inventor: Hermann Grau, Durlangen-Tanau, Germany

[73] Assignee: TRW Occupant Restraint System GmbH, Alfdorf, Germany

[21] Appl. No.: 591,276

[22] Filed: Jan. 25, 1996

[30] Foreign Application Priority Data

Feb. 10, 1995 [DE] Germany ............... 295 02 192.6

[51] Int. Cl.$^6$ ............................................. B60R 22/00
[52] U.S. Cl. ............... 280/808; 280/801.1; 297/483
[58] Field of Search ................... 280/808, 801.1; 297/468, 473, 483

[56] References Cited

U.S. PATENT DOCUMENTS

| | | | |
|---|---|---|---|
| 4,005,904 | 2/1977 | Weman et al. | 297/483 |
| 4,349,217 | 9/1982 | Fohl | 280/808 |
| 4,369,931 | 1/1983 | Fohl | 280/808 X |
| 5,096,224 | 3/1992 | Murakami et al. | 280/483 X |
| 5,257,820 | 11/1993 | Kosugi | 280/808 |
| 5,513,880 | 5/1996 | Ohira et al. | 280/808 |

FOREIGN PATENT DOCUMENTS

| | | | |
|---|---|---|---|
| 2524326 | 10/1983 | France. | |
| 2711401 | 9/1978 | Germany | 297/483 |
| 7724892 | 12/1978 | Germany. | |
| 7818261 | 11/1979 | Germany. | |
| 8322560 | 2/1984 | Germany. | |
| 3401938 | 11/1985 | Germany. | |
| 54-78132 | 4/1978 | Japan. | |
| 53-73627 | 6/1978 | Japan. | |
| 53-118232 | 9/1978 | Japan. | |
| 55-151971 | 2/1979 | Japan. | |
| 53-25019 | 3/1981 | Japan. | |
| 2042871 | 10/1980 | United Kingdom. | |

Primary Examiner—Christopher P. Ellis
Attorney, Agent, or Firm—Tarolli, Sundheim, Covell, Tummino & Szabo

[57] ABSTRACT

A deflection fitting for vehicular safety belt systems comprises a yoke with a pair of parallel limbs interconnected by a rod and a roller rotatably mounted on the rod. The roller has a cylindrical main section between a pair of axial end sections. A substantially continuous and concavely curved transition is provided from the main section to each end section of the roller and from each end section to an adjacent limb surface portion.

7 Claims, 1 Drawing Sheet

DEFLECTION FITTING FOR SAFETY BELTS

BACKGROUND OF THE INVENTION

The present invention relates to a deflection fitting for a vehicular safety belt system.

A deflection fitting with a roller mounted on a rod between a pair of yoke limbs is disclosed in German patent publication 2,905,862 C2. Owing to the rotatably mounted roller, friction on deflection of the belt is substantially reduced. Frictional losses at the deflection fitting would impair the comfort of using the safety belt, because a stronger winding spring would then have to be incorporated in the belt retractor. However, deflection fittings with a rotatably mounted roller have not proved successful so far, because the deflection fitting is usually pivotally mounted in a vehicle and if the deflection fitting has a large pivot angle the belt webbing will be compressively deformed at its longitudinal edges so that movement of the belt webbing is obstructed and the desired free running properties are not provided.

Deflection fittings presently conventionally employed comprise a stamped steel part encased in molded synthetic resin. Between the belt webbing and the deflecting surface there is pure sliding friction. Overcoming such sliding friction calls for a winding up spring of sufficient force. In order for user comfort not to be excessively impaired by such a relatively powerful winding up spring while at the same time fulfilling present day requirements as regards user comfort, belt retractors are provided with an expensive, so-called comfort device, which in a certain range of belt pay-out overrides the normal winding up spring and causes an auxiliary spring of lesser power to become effective in its stead. Such a comfort device is however involved in its mechanical design and is consequently only to be fitted in luxury vehicles.

SUMMARY OF INVENTION

The present invention provides a deflection fitting for safety belts, which reduces losses due to redirecting the belt webbing to such an extent that a comfort device for the belt retractor is unnecessary while nevertheless not causing any undesirable compressive deformation on the longitudinal edges of the belt webbing over a wide range of pivoting of the fitting and furthermore being amenable of simple manufacture.

In the deflection fitting in accordance with the invention between the cylindrical main section of the roller and the internal surface of the limbs of the yoke a continuously concavely curved transition is formed, which is merely interrupted by a narrow gap between each axial end of the roller and an adjacent limb surface. Owing to the concavely curved transition between the cylindrical main section of the roller and the internal surface of the limbs at its longitudinal edge the belt webbing is only slightly, but continuously, bent in accordance with the configuration of the transition. The freely running movement of the belt webbing through the deflecting fitting is not impaired by this.

Further advantageous developments and convenient forms of the invention will be understood from the following detailed descriptive disclosure of embodiments thereof in conjunction with the accompanying drawings.

DETAILED DESCRIPTION

Figure 1:
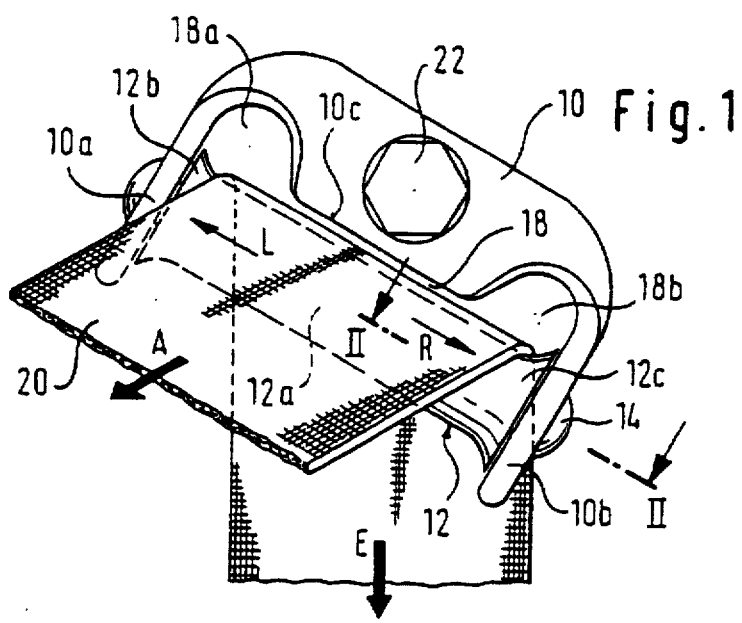
FIG. 1 diagrammatically shows in perspective a first embodiment of the deflection fitting.
Figure 2:
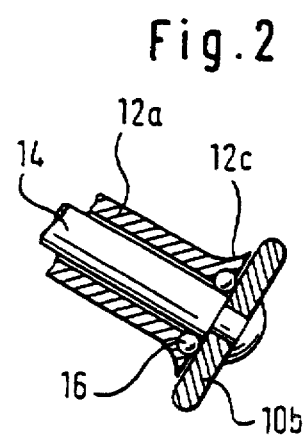
FIG. 2 shows a section taken on the line II—II of FIG. 1.

In all embodiments thereof the deflection fitting comprises a U-shaped yoke 10, which is produced by bending a narrow sheet metal strip of constant width, and a belt roller 12, which is rotatably mounted between the parallel limbs 10a and 10b of the yoke 10 on a pin or rod 14. The roller 12 comprises a cylindrical main section 12a and two trumpetlike, widening end sections 12b and 12c. At such end sections 12b and 12c the roller 12 is rotatably mounted by means of balls 16 on the pin 14. The end sections 12b and 12c of the roller 12 constitute a continuously concavely curved transition between the cylindrical main section 12a of the roller 12 and the internal surface of the respective limb 10a and, respectively, 10b of the yoke 10. This transition is only interrupted by a narrow gap between the axial ends of the roller 12 and the adjacent limb 10a or, respectively, 10b. The transition so formed between the roller 12 and the internal surfaces of the limbs 10a and 10b of the yoke 10 extends in an approximately circular manner for 90° and is continued with generally the same curvature at the yoke 10. Between the yoke 10 and the roller 12 a passage slot 18 for the belt webbing 20 is formed, the belt webbing being bent by and trained about the roller 12. This passage slot 18 is enlarged at its ends in the form of cusps. Such cusps 18a and 18b continue the curvature of the transition between the roller 12 and the internal surface of the limbs 10a and 10b of the yoke in a continuous, smooth fashion in order then, after a point of inflection, to merge with a straight, internally placed edge 10c of the sheet metal strip, from which the yoke 10 has been bent.

The yoke 10 is secured by means of a screw 22 on the B post of a vehicle. It is mounted in freely swiveling manner on such screw 22. The position of swivel illustrated in FIG. 1 of the deflecting fitting corresponds to its position of use with the safety belt fastened. In this state the belt webbing extends from the belt retractor perpendicularly upward, over the roller 12 and then obliquely toward the shoulder of the vehicle occupant. The orientation of the deflection fitting is dictated solely by this alignment of the belt webbing. When belt webbing is drawn in the direction of the arrow A from the belt retractor, the belt webbing will tend to slip upward in the direction of the arrow L in the axial direction of the roller 12, the respective longitudinal edge of the belt webbing 20 running over the end section 12b of the roller 12. This longitudinal edge of the belt webbing 20 will then follow the continuous curvature of this end section 12b; compressive deformation of the belt webbing, which would impair smooth, fee running of the belt webbing over the roller 12, is prevented. On rolling up the belt webbing in the direction E the belt webbing will tend to slip in the direction R in FIG. 1; at this time the respective longitudinal edge of the belt webbing will run over the end section 12c and will itself assume the continuous curvature of such end section.

Figure 3:
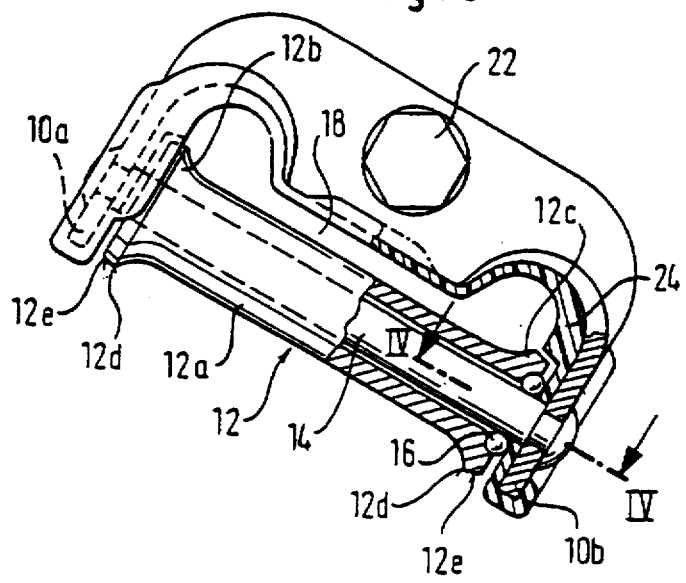
FIG. 3 shows a partially sectioned representation of a second embodiment of the deflection fitting.
Figure 4:
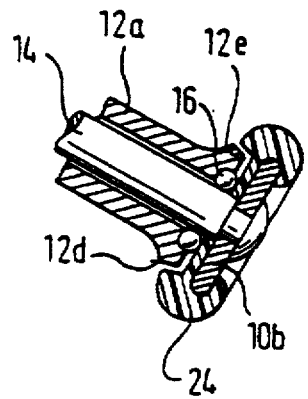
FIG. 4 is a sectional elevation taken on the line IV—IV of FIG. 3.

In the embodiment depicted in FIG. 3 as well, the roller 12 possesses a cylindrical main section 12a and enlarged end sections 12b and 12c. These end sections 12b and 12c only constitute a fraction of approximately 45° of the concavely curved transition between the main section 12a and the internal surface of the yoke 10. The concavely curved surface of the end section 12b and, respectively, 12c ends at an edge 12d and merges with a slanting, conical surface 12e. These conical surface 12e is opposite a correspondingly formed opposing surface of a lining part 24 with the formation of a narrow gap, such lining part 24 covering the internal surface of the yoke 10 and continuously, that is to say smoothly, continuing the curvature of the end sections 12b and 12c of the roller 12 so that the same geometry is produced as in the previously described embodiment. As shown in FIG. 4, the lining part 24 fits around the edges of the sheet metal strip, from which the yoke 10 has been formed. The lining part 24 consists of synthetic resin and is clipped onto the yoke 10 are fixed in place by the pin 14.

Figure 5:
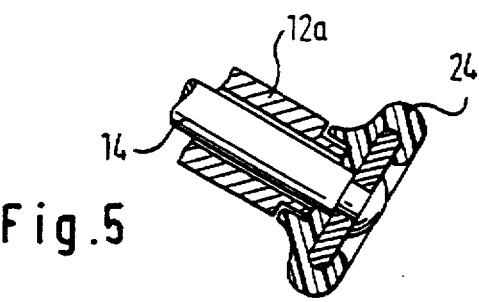
FIG. 5 is a section to show part of a preferred embodiment.

In the embodiment depicted in FIG. 5, the lining part 24 directly adjoins the cylindrical main part 12a of the roller 12 with the formation of a narrow radial gap. The smoothly or continuously concavely curved transition is in this case hence formed by the lining part 24 alone. Even without the use of anti-friction elements the roller will be carried in a freely running manner on the pin 14. The axial cylindrical ends of the roller 12 are reduced in diameter with the formation of a step. Each end section so formed of the roller 12 are surrounded by a sleeve member on the lining 24. Owing to this design, the free running properties of the roller 12 on the pin 14 are improved. Although in this embodiment a marginal part of the belt webbing may run over the concavely curved surface of the lining part 24, the free running properties for the belt webbing are not substantially impaired, since the main part runs over the readily rotated roller 12.

In the embodiment as described the lining part 24 does not constitute a separate component. It may also be formed by molded on synthetic resin in the form of a casing on the yoke 10. In accordance with another design the yoke 10 is not in the form of a bent sheet metal strip, but is formed by pressing or injection casting so that it has the external form of the lining part and a separate lining part is unnecessary.

What is claimed is:

1. A deflection fitting for vehicular safety belt systems, comprising a yoke with a pair of parallel limbs interconnected by a rod and a roller rotatably mounted on said rod, said roller having a cylindrical main section between a pair of axial end sections, wherein a substantially continuous and concavely curved transition surface is provided from said main section to each of said end sections and from each end section to an adjacent limb surface portion, a passage slot is provided between the roller and the yoke, said passage slot being enlarged at its ends in the form of cusps and said cusps continuing the curvature of the transition surface across at least about 180°, said transition surface between each of said end sections and the adjacent limb surface portion being interrupted by a narrow gap between the axial ends of the roller and the internal limb surface portions, and said transition surface extending for an angle of approximately 90° substantially along a circular arc.

2. The deflection fitting of claim 1, wherein said roller is mounted on said rod by means of ball bearings.

3. The deflection fitting of claim 2, wherein one of said ball bearings is arranged at each end section of the roller.

4. The deflection fitting of claim 1, wherein said yoke is of a metallic material and at least each limb surface portion adjacent to an end section of said roller is provided with a lining of a low-friction plastics material.

5. A deflection fitting for vehicular safety belt systems, comprising a yoke with a pair of parallel limbs interconnected by a rod, a roller rotatably mounted on said rod, said roller having a cylindrical main section between a pair of reduced-diameter cylindrical end sections, and a lining of low-friction material at least covering each limb adjacent each of said roller end sections, wherein a substantially continuous and concavely curved transition surface is provided from each of said linings to said roller main section, a passage slot is provided between the roller and the yoke, said passage slot being enlarged at its ends in the form of cusps and said cusps continuing the curvature of the transition surface across at least about 180°, said transition surface between each of said linings and said roller main section being interrupted by a narrow gap between the axial ends of the roller main section and the linings, and said transition surface extending for an angle of approximately 90° substantially along a circular arc.

6. The deflection fitting of claim 5, wherein each of said linings has a sleeve portion fitting around an adjacent roller end section.

7. A deflection fitting for vehicular safety belt systems comprising:

a yoke with a pair of parallel limb portions;

a rod extending between said limb portions and connected to said limb portions;

a roller rotatably mounted on said rod, said roller having a cylindrical main section extending between a pair of axial end sections;

a pair of substantially continues curved transition surfaces extending from said main section of said roller to each of said limb portions and along at least a portion of each of said limb portions.

* * * * *